US007293783B2

(12) United States Patent
Whiteside et al.

(10) Patent No.: US 7,293,783 B2
(45) Date of Patent: Nov. 13, 2007

(54) CREEPER WITH TRAYS

(75) Inventors: Kirt E. Whiteside, Marion, OH (US); Shane Obitts, Elyria, OH (US)

(73) Assignee: Whiteside Manufacturing Co., Delaware, OH (US)

(*) Notice: Subject to any disclaimer, the term of this patent is extended or adjusted under 35 U.S.C. 154(b) by 17 days.

(21) Appl. No.: 11/326,913

(22) Filed: Jan. 6, 2006

(65) Prior Publication Data

US 2006/0170170 A1 Aug. 3, 2006

Related U.S. Application Data

(60) Provisional application No. 60/649,160, filed on Feb. 3, 2005.

(51) Int. Cl.
*B25H 5/00* (2006.01)
*B62B 3/00* (2006.01)
*B62B 11/00* (2006.01)

(52) U.S. Cl. ................ 280/32.6; 280/32.5; 280/79.11; 280/79.2; 280/47.34; 280/47.27

(58) Field of Classification Search ............... 280/32.6, 280/32.5, 79.11, 79.2, 47.34, 47.27
See application file for complete search history.

(56) References Cited

U.S. PATENT DOCUMENTS 1,104,398 A * 7/1914 Zimmerman ............... 280/32.6
1,721,508 A * 7/1929 Dahlberg ................... 280/32.6
D230,971 S 3/1974 Shanklin ................... D14/3 M
D321,072 S * 10/1991 Bennett et al. .............. D34/23
D325,799 S 4/1992 Chen ........................... D34/23
5,174,592 A 12/1992 Pool .......................... 280/32.6
D351,707 S 10/1994 Pill ............................. D34/23
5,378,003 A * 1/1995 Burd et al. ................ 280/32.6
5,624,126 A * 4/1997 Vosbikian et al. ......... 280/32.6
D396,920 S 8/1998 Whiteside et al. ........... D34/23
D398,433 S * 9/1998 Whiteside et al. ........... D34/23
D401,714 S * 11/1998 Whiteside et al. ........... D34/23
D401,715 S * 11/1998 Whiteside et al. ........... D34/23
D403,822 S 1/1999 Whiteside et al. ........... D34/23
D406,433 S * 3/1999 Taylor et al. ................ D34/23
D436,708 S 1/2001 Whiteside .................... D34/27

(Continued)

OTHER PUBLICATIONS

Publication of Lisle Corp., Clarinda, Iowa, pp. 44 and 45, undated.

(Continued)

*Primary Examiner*—Christopher P. Ellis
*Assistant Examiner*—John R. Olszewski
(74) *Attorney, Agent, or Firm*—Renner, Kenner, Greive, Bobak, Taylor & Weber

(57) ABSTRACT

A creeper (10) includes an outer frame (16) including side rails (19) and end members (17, 25). Support rails (33) extend longitudinally between the end members (17, 25), and they carry a headrest pad (13) and a body pad (12). There are no lateral supports between the side rails (19). Tray frames (23) carry trays (14) within the profile of the outer frame (16). A plurality of laterally opposed, longitudinally spaced, pairs of caster assemblies (15A, B, C) are carried by the side rails (19) and each pair is laterally spaced differently than the other pairs.

5 Claims, 3 Drawing Sheets

U.S. PATENT DOCUMENTS

| | | | | |
|---|---|---|---|---|
| D458,432 S | | 6/2002 | Whiteside et al. | D34/23 |
| 6,705,622 B2 | | 3/2004 | Whiteside | 280/32.6 |
| 6,966,564 B2 | * | 11/2005 | Hernandez, Jr. | 280/32.6 |
| D521,206 S | * | 5/2006 | Obbitts et al. | D34/23 |
| D521,708 S | * | 5/2006 | Obbitts et al. | D34/23 |
| D522,707 S | * | 6/2006 | Obbitts et al. | D34/23 |
| 2003/0168824 A1 | * | 9/2003 | Miles | 280/32.6 |

OTHER PUBLICATIONS

Cover page of 1993 Catalog of Whiteside Mfg. Co., Delaware, Ohio.

* cited by examiner

CREEPER WITH TRAYS

CROSS-REFERENCE TO RELATED APPLICATION

This application claims the benefit of U.S. Provisional Application No. 60/649,160 filed on Feb. 3, 2005.

TECHNICAL FIELD

This invention relates to a mechanic's creeper. More particularly, this invention relates to a creeper which has a frame with a wider wheel base, which has no crossmembers, and which can carry trays within the profile of the frame as viewed in plan view.

BACKGROUND ART

Typical mechanic's creepers include a frame having parallel, longitudinally extending side rails that carry casters which render the creeper mobile. The side rails are interconnected at their ends and also by a plurality of laterally extending, longitudinally spaced crossmembers which hold a pad which supports the body of the user of the creeper. The pad is usually provided with a thickened area which serves as a headrest.

One problem with these types of creepers is their stability. That is, with the casters being oriented longitudinally aligned with each other on the side rails, a shifting of the weight of the user could cause a tipping of the creeper.

Another drawback of the creepers with these types of frames is that the crossmembers can interfere with the ability of the user to gain ready access to something located under the creeper. That is, oftentimes a tool, fastener or the like being employed by the user of the creeper will find its way under the creeper, and if the user attempts to reach under the creeper to gain access to the item, the crossmembers will prohibit the user from doing so.

Moreover, it is advantageous to provide these creepers with trays or the like to hold the items being employed by the user to perform his tasks. One prior art creeper does provide trays which hang on the outside of the frame. While such does permit the user to store or carry items in these trays, because these trays extend out from the frame like wings, an obstacle to the movement of the creeper in crowded areas is presented. Moreover, these trays can readily be bumped or damaged because they are structurally unprotected.

Thus, the need exists for a creeper which eliminates the problems discussed above, which is more stable than the prior art creepers, and which can safely and efficiently be provided with tool trays.

DISCLOSURE OF THE INVENTION

In accordance with one aspect of the present invention it is an object to provide a creeper which can carry trays protected within the profile of its frame.

In accordance with another aspect of the present invention, it is an object to provide a creeper which does not have lateral supports extending between its side rails.

In accordance with an additional aspect of the present invention, it is an object to provide a creeper with caster assemblies which are not longitudinally aligned thereby promoting stability.

These and other objects of the present invention, as well as the advantages thereof over existing prior art forms, which will become apparent from the description to follow, are accomplished by the improvements hereinafter described and claimed.

In general, a creeper made in accordance with the present invention includes a frame having longitudinally extending, laterally spaced, side rails interconnected by longitudinally spaced, laterally extending, end members. In accordance with one aspect of the invention, at least one tray is carried by the frame within its outer profile. In accordance with another aspect of the invention, the end members are the only connection between the side rails, and at least one support rail extends longitudinally between the end members, and is not connected to the side rails. In accordance with yet another aspect of the invention, a plurality of pairs of laterally opposed, longitudinally spaced, caster assemblies are carried by the side rails. The caster assemblies of each pair of caster assemblies have different lateral spacing.

A preferred exemplary creeper according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
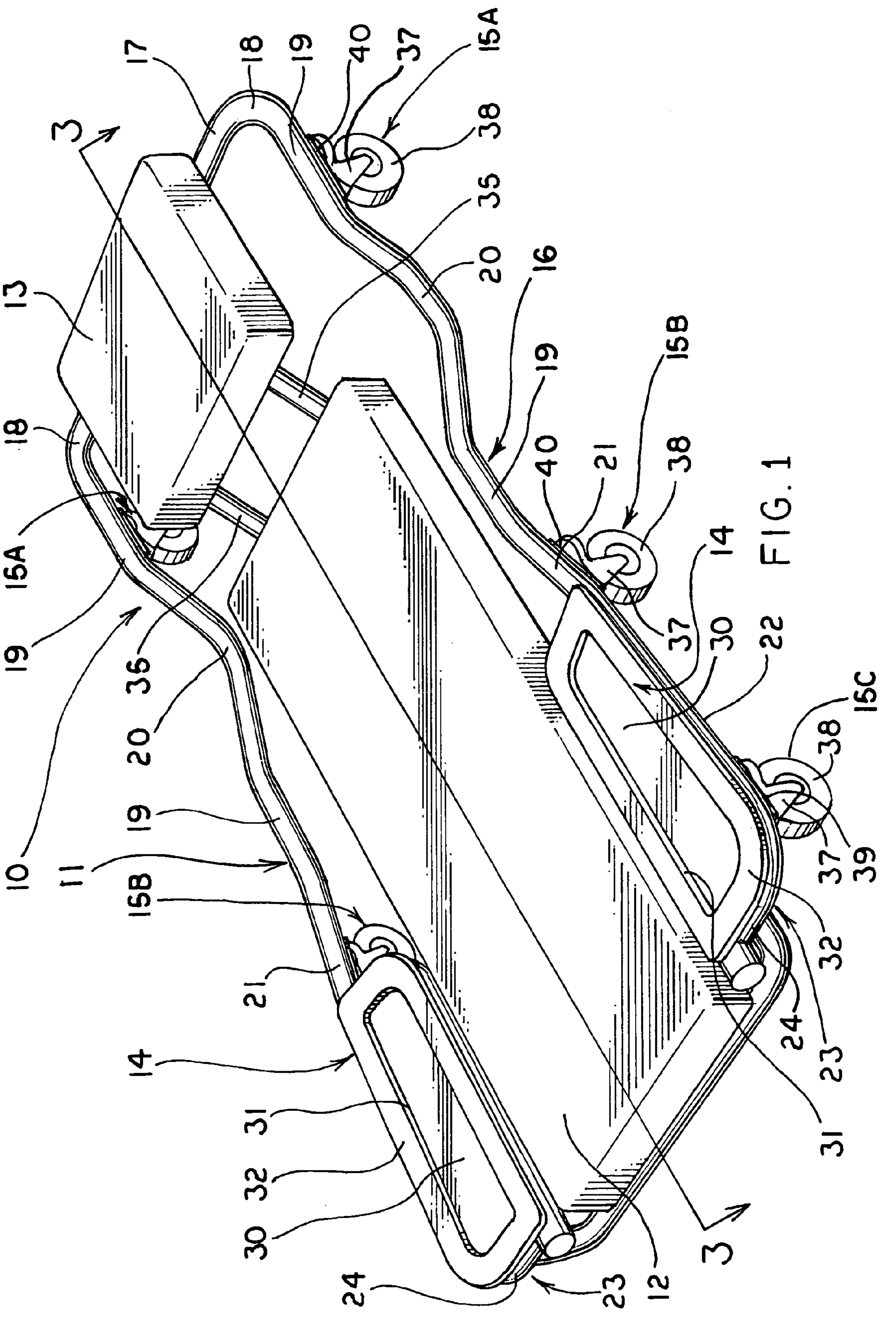
FIG. 1 is a perspective view showing a creeper made in accordance with the concepts of the present invention.

A mechanic's creeper made in accordance with the concepts of the present invention is generally indicated by the numeral 10. Creeper 10 includes a frame, generally indicated by the numeral 11, a body pad 12, a headrest pad 13, trays generally indicated by the numeral 14, and a plurality of opposed pairs of caster assemblies generally indicated by the numerals 15A, 15B and 15C.

Figure 2:
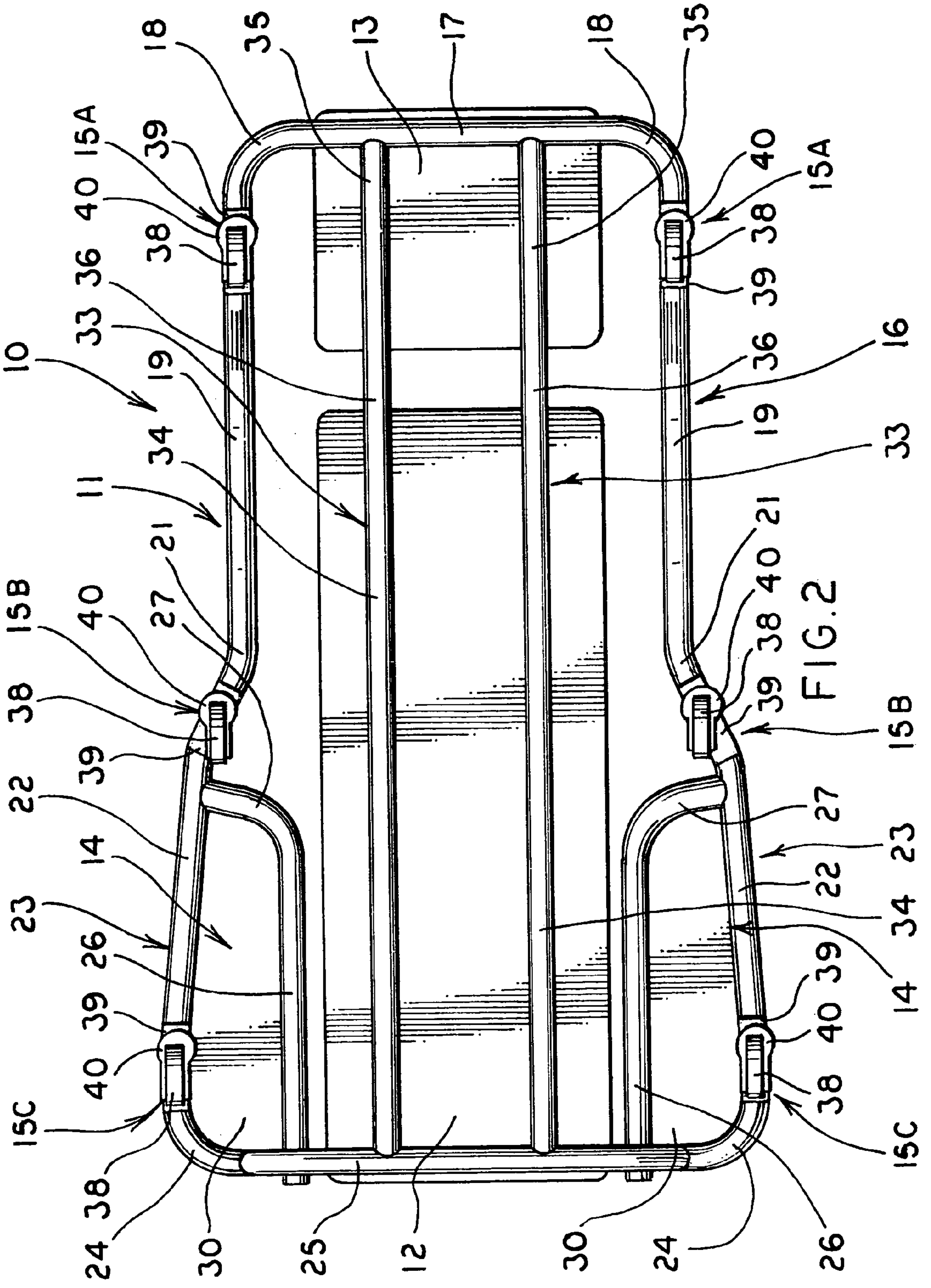
FIG. 2 is a bottom plan view of the creeper shown in FIG. 1.
Figure 3:
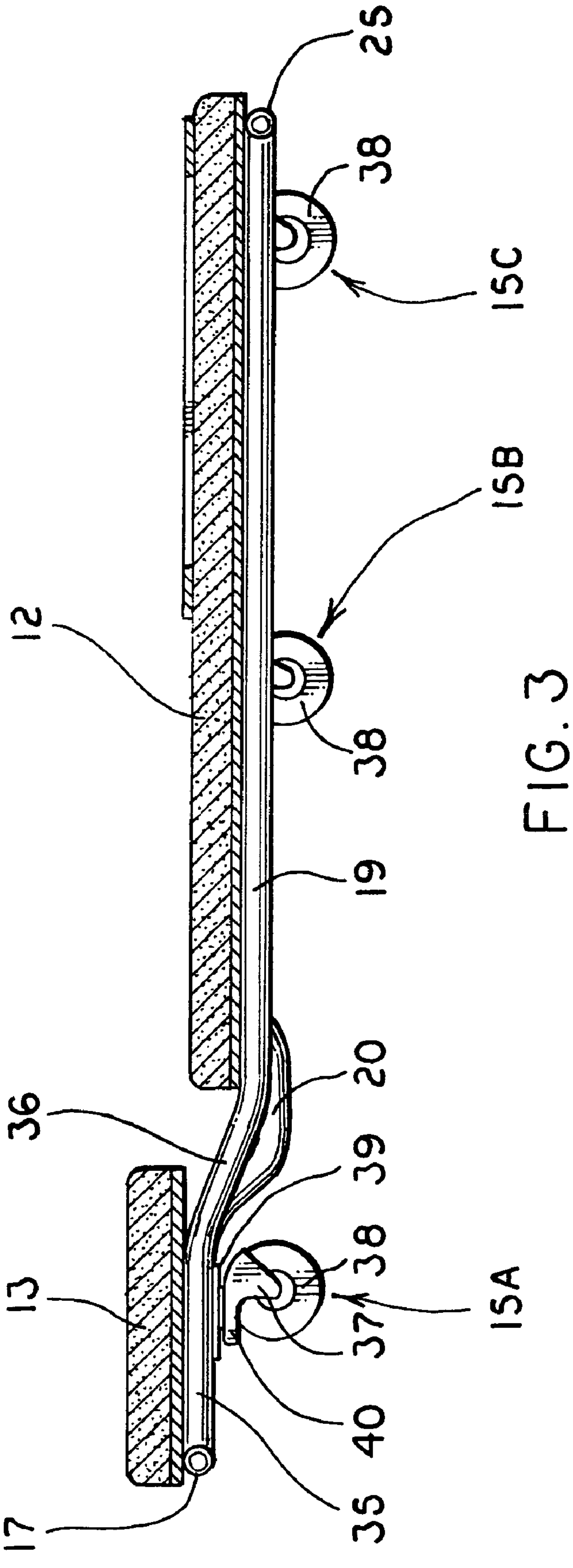
FIG. 3 is a sectional view taken substantially along line 3-3 of FIG. 1.

All of the components of frame 11 are preferably circular or tubular in configuration and include a continuous main outer frame, generally indicated by the numeral 16. Outer frame 16 includes a laterally extending end member 17 positioned generally under and supporting the longitudinal end of headrest pad 13. The lateral ends of member 17 are formed as elbows 18 such that outer frame 16 turns approximately ninety degrees. Longitudinally extending, laterally spaced side rails 19 extend from the other end of elbows 18. Side rails 19 are generally straight, as viewed in plan in FIG. 2, but as shown in FIG. 1, side rails 19 dip down, as at 20, at a point approximating the longitudinal end of body pad 12 adjacent to headrest pad 13.

The straight portions of side rails 19 are generally parallel to each other and extend longitudinally from end member 17 to somewhat more than half the longitudinal length of creeper 10. The straight portions then flare laterally, outwardly as at side rail portion 21. Each side rail portion 21 of outer frame 16 terminates as a generally straight portion 22 of a tray frame generally indicated by the numeral 23. Straight side rail portions 22 diverge laterally outwardly from each other as they extend from frame portions 21 such that outer frame 16 becomes progressively wider at points further away from end member 17. Tray frame 23 of outer frame 16 includes an elbow 24 formed at the end of portions 22 of tray frame 23, and elbows 24 meet a laterally extending end member 25 positioned generally under and supporting one longitudinal end of body pad 12. End member 25 thus completes the continuous outer frame 16.

Each tray frame 23 also includes a straight tubular portion 26 extending from end member 25 at the approximate junction of end member 25 and elbows 24. Each portion 26 is thus spaced laterally inwardly from portion 22 of tray frame 22, and terminates as curved portion 27 which ends back at portion 22. As a result, tray frames 23, which include side rail portion 22, elbow 24 and portions 26 and 27, provide the means to carry trays 14 laterally, and internally of the profile of outer frame 16 when viewed in plan view. As such, the trays 14 and their contents are fully protected by the outer frame 16 from damage.

Each tray 14 includes a bottom surface 30, sidewalls 31 extending upwardly therefrom, and a peripheral flange 32 extending laterally, outwardly from the top of sidewalls 31 and having the peripheral shape of tray frames 23. Trays 14 are preferably removable from tray frames 23, and when positioned in tray frames 23, flange 32 rests on all of the components of tray frame 23. Tools, fasteners, other hardware and the like can thus be positioned on the bottom surface 30 of trays 14 conveniently within the reach of the user of creeper 10.

Frame 11 also includes one or more support rails, generally indicated by the numeral 33, (two shown) which are laterally spaced and extend longitudinally between end members 17 and 25 of outer frame 16. Rails 33 are uninterrupted by the lateral supports typically found in the prior art and, with end members 17 and 25, support headrest pad 13 and body pad 12, respectively. Rails 33 are also preferably round or tubular in configuration and provide the support necessary to carry the user of creeper 10.

As such, each rail 33 includes a generally straight, generally horizontal portion 34 under body pad 12, and a generally straight, generally horizontal portion 35 under headrest pad 13. Horizontal portion 34 extends longitudinally from end member 25 toward end member 17, and portion 35 extends longitudinally from end member 17 toward end member 25. Portion 34 is positioned lower than portion 35 such that portion 35 elevates headrest pad 13 above body pad 12. Thus, portions 34 and 35 are joined by a portion 36 extending angularly, upwardly from portion 34 to portion 35.

By virtue of the fact that side rails 19 are not connected to each other by lateral supports, other than end members 17 and 25, and by virtue of the fact that rails 33 are not connected to each other or to side rails 19 by lateral supports, items which may be positioned under creeper 10 may be more easily accessed particularly from either longitudinal end of creeper 10.

Caster assemblies 15A, 15B and 15C are conventional items each having a support horn 37 which is rotatably mounted to frame 16 on a vertical axis relative to outer frame 16. Each support horn 37 carries a wheel 38 which is rotatable on a horizontal axis. Because frame 16 is round, in order to mount caster assemblies 15A, 15B and 15C thereto, a flat plate 39 may be welded to the underside of frame 16 at the location of each caster assembly, and a bearing bracket 40 which carries horn 17 may be attached to plate 39 to attach caster assemblies 15A, 15B and 15C to the round tubing of frame 16.

Because of the profile of outer frame 16, the positioning of caster assemblies 15A, 15B and 15C becomes important. As now will be discussed, each pair of caster assemblies 15A, 15B and 15C is laterally spaced differently than the others, that is, they are not longitudinally aligned, and their longitudinal spacing is unequal as well. Thus, caster assemblies 15A are positioned laterally closest to each other at a longitudinal location generally near the longitudinal end of said rails 19 where they join elbow 18. As such, caster assemblies 15A are positioned at generally the longitudinal center of headrest pad 13.

Caster assemblies 15B are spaced laterally further apart than caster assemblies 15A and are shown as being mounted on angular frame portions 21. Thus, caster assemblies 15B are located between the end of side rails 19 and portion 22 of tray frame 23. As such, caster assemblies 15B are located longitudinally further from caster assemblies 15A than from caster assemblies 15C, and are approximately at the longitudinal center of body pad 12.

Caster assemblies 15C are spaced laterally further apart than caster assemblies 15B and are shown as being carried near the longitudinal end of portions 22 of tray frames 23 where they join elbows 24. As such, caster assemblies 15C are located near a longitudinal end of body pad 12.

In view of the fact that the caster assemblies 15A, 15B and 15C on each side rail 19 are not longitudinally aligned, creeper 10, with its wider base at the area of trays 14, is more stable than those of the prior art.

In light of the foregoing, it should thus be evident that a creeper with trays constructed as described herein accomplishes the objects of the present invention and substantially improves the art.

What is claimed is:

1. A creeper comprising a frame having longitudinally extending laterally spaced side rails interconnected by longitudinally spaced laterally extending end members, said end members being the only connection between said side rails, at least one support rail longitudinally extending between said end members, said support rail not being connected to said side rails, a first pad carried by said support rails, and a second pad carried by said support rails, there being a space between said pads in both the longitudinal direction and the vertical direction.

2. The creeper of claim 1 wherein there are two laterally spaced longitudinally extending support rails.

3. The creeper of claim 1 wherein each support rail includes a first generally horizontal portion supporting said first pad, a second generally horizontal portion supporting said second pad, and a third portion between said first and second portions.

4. The creeper of claim 1 further comprising at least one tray carried by said frame within the profile of said frame.

5. A creeper, comprising a frame having longitudinally extending laterally spaced side rails interconnected by longitudinally spaced laterally extending end members, said frame thereby having an outer profile, two trays carried by said frame within said outer profile, and a tray frame extending inwardly from each said side rail, each said tray having a bottom surface, sidewalls extending upwardly from the periphery of said bottom surface, and a flange extending outwardly from the upper periphery of said sidewalls, said flange being adapted to rest on said tray frame and on a portion of said side rail.

* * * * *